(No Model.)
G. RADER.
UNDERGROUND CONDUIT FOR ELECTRIC WIRES.
No. 369,813. Patented Sept. 13, 1887.
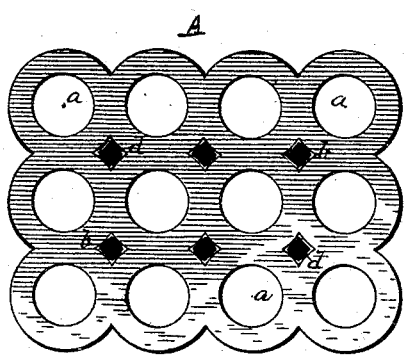
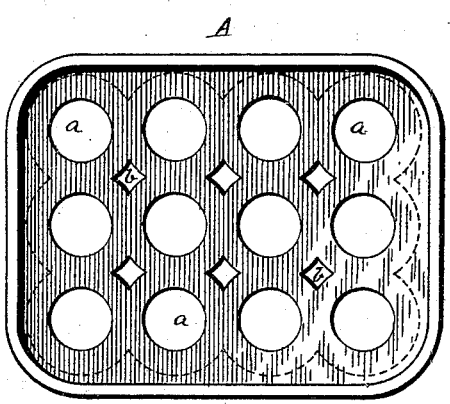
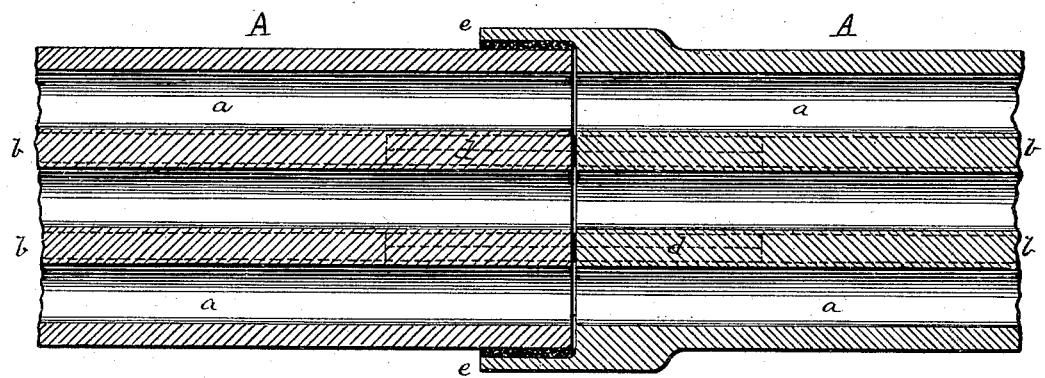
WITNESSES:
INVENTOR
Gustav Rader
BY
ATTORNEYS.

UNITED STATES PATENT OFFICE.

GUSTAV RADER, OF NEW YORK, N. Y.

UNDERGROUND CONDUIT FOR ELECTRIC WIRES.

SPECIFICATION forming part of Letters Patent No. 369,813, dated September 13, 1887.

Application filed May 11, 1887. Serial No. 237,806. (No model.)

*To all whom it may concern:*

Be it known that I, GUSTAV RADER, of the city, county, and State of New York, have invented certain new and useful Improvements in Underground Conductors for Electric Wires, of which the following is a specification.

This invention relates to an improved underground conduit for electric wires in which a number of longitudinal ducts for the cables containing the electric wires are arranged and the sections of which can be accurately centered and connected; and the invention consists of an underground conduit for electric wires which is provided with a series of larger longitudinal openings for the electric wires and intermediately between the same, with a number of smaller longitudinal openings which serve for the insertion of connecting-pieces at the ends of the conduit-sections, so as to properly center the ends. Each section of underground conduit is provided at one end with a socket that fits over the spigot end of the adjoining section by a filling of cement.

In the accompanying drawings, Figure 1 represents an end elevation of my improved underground conduit for electric wires. Fig. 2 is an elevation of the opposite end of the same. Fig. 3 is a vertical longitudinal section showing the joint between two adjoining conduit-sections.

Similar letters of reference indicate corresponding parts.

A A in the drawings represent two adjoining sections of my improved underground conduit for electric wires. The sections A A are preferably made of pipe-clay in a suitable mold and provided with a number of longitudinal openings, *a a*, preferably of round shape, through which the electric wires are passed in the form of cables or otherwise and intermediately between the openings *a*, with smaller longitudinal openings *b*, preferably of square shape.

The conduits A A are preferably made of oblong cross-section, channeled at the outside and rounded off at the corners, so that each individual longitudinal duct *a* has a wall of uniform thickness, as shown in Fig. 1. This not only reduces the weight of the conduit, but permits of the more uniform burning of the same in the kiln. The smaller openings *b* serve for inserting square pieces *d d* of wood or other suitable material, to form a reliable joint between two adjoining conduit-sections, A A, as shown in dotted lines in Fig. 3. The connecting-pieces *d d* produce the accurate centering of the sections. Each section is provided at one end with a flange or socket, *e*, into which the opposite plain or spigot end is inserted, so as to form a joint between the conduit-sections. The space formed between the longitudinal side channels of the sections and the wall of the socket *e* is filled up with a suitable cement, as shown in Fig. 3.

In this manner an underground conduit for electric wires is obtained which can be made in molds like clay pipes, and which has a large number of longitudinal ducts for the electric wires, and which is accurately centered and jointed by the connecting-pieces extending into the spigot and socket ends of two adjoining conduit-sections.

Having thus described my invention, I claim as new and desire to secure by Letters Patent—

1. An underground conduit for electric wires provided with a series of longitudinal ducts and a second series of smaller longitudinal openings arranged intermediately between the first longitudinal ducts, said conduits having rounded-off ends and longitudinal channels at the sides, so as to provide a uniform thickness of material in the walls surrounding the individual ducts, substantially as set forth.

2. The combination of two adjacent sections of underground conduits, each being provided with a series of larger longitudinal ducts and a series of smaller intermediate openings with short connecting-pieces inserted into the smaller openings to some distance from their ends for connecting and centering the adjoining ends of the conduit-sections, substantially as set forth.

In testimony that I claim the foregoing as my invention I have signed my name in presence of two subscribing witnesses.

GUSTAV RADER.

Witnesses:
PAUL GOEPEL,
SIDNEY MANN.